Dec. 19, 1967  W. H. HICKOK ETAL  3,359,399
HIGH FREQUENCY HEATING SYSTEM
Filed July 25, 1963  3 Sheets-Sheet 3
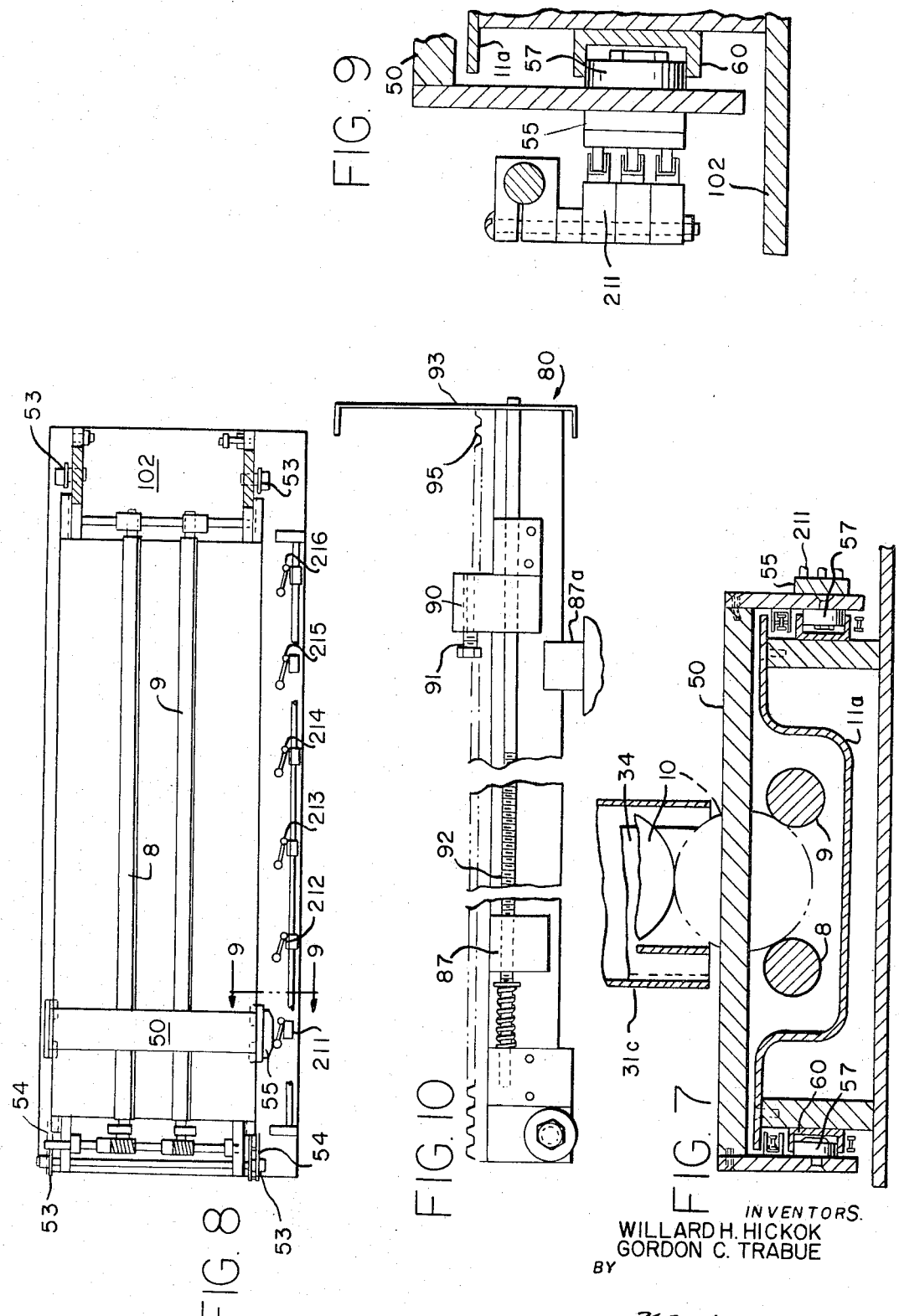
INVENTORS.
WILLARD H. HICKOK
GORDON C. TRABUE
BY
ATTORNEY

United States Patent Office 3,359,399
Patented Dec. 19, 1967

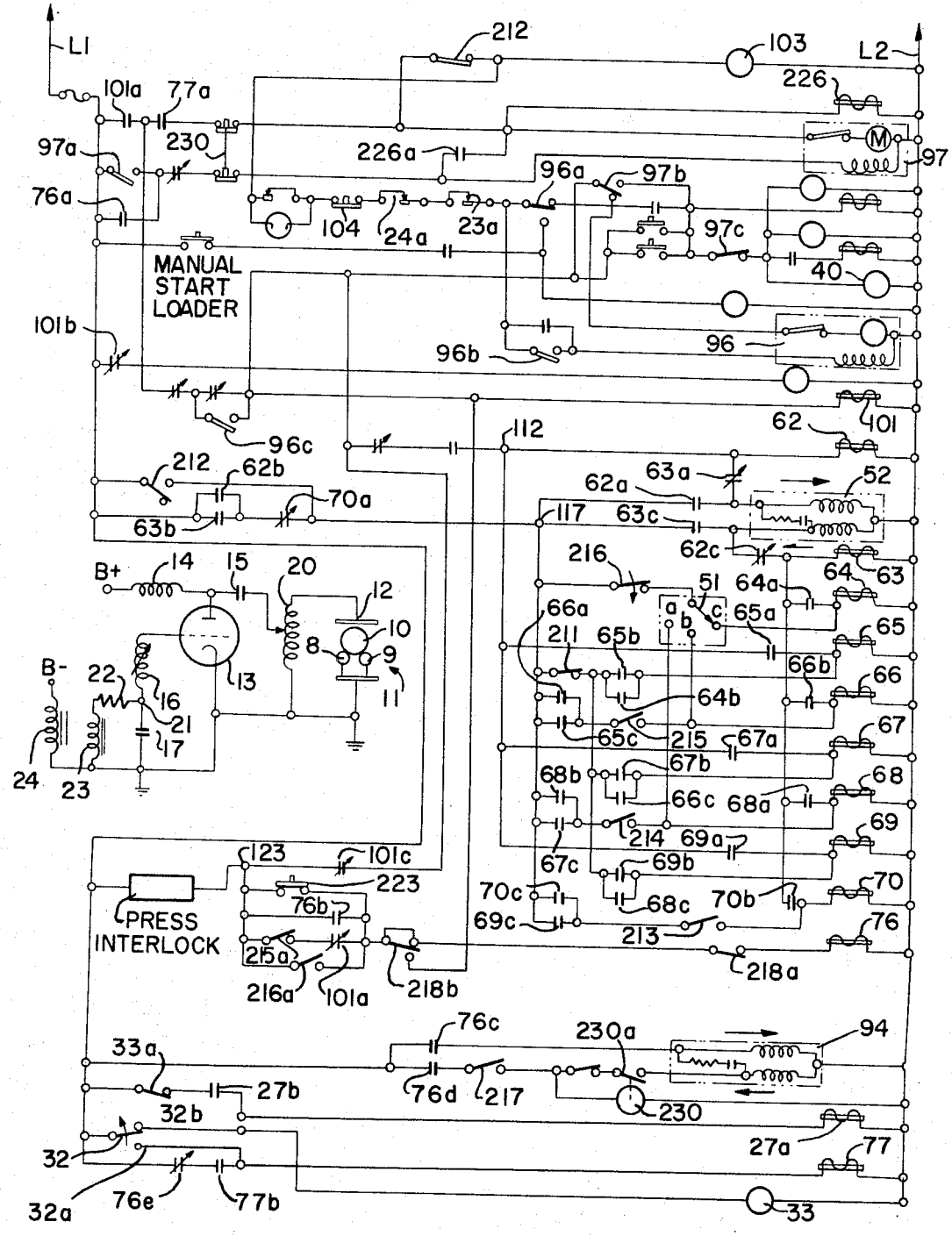

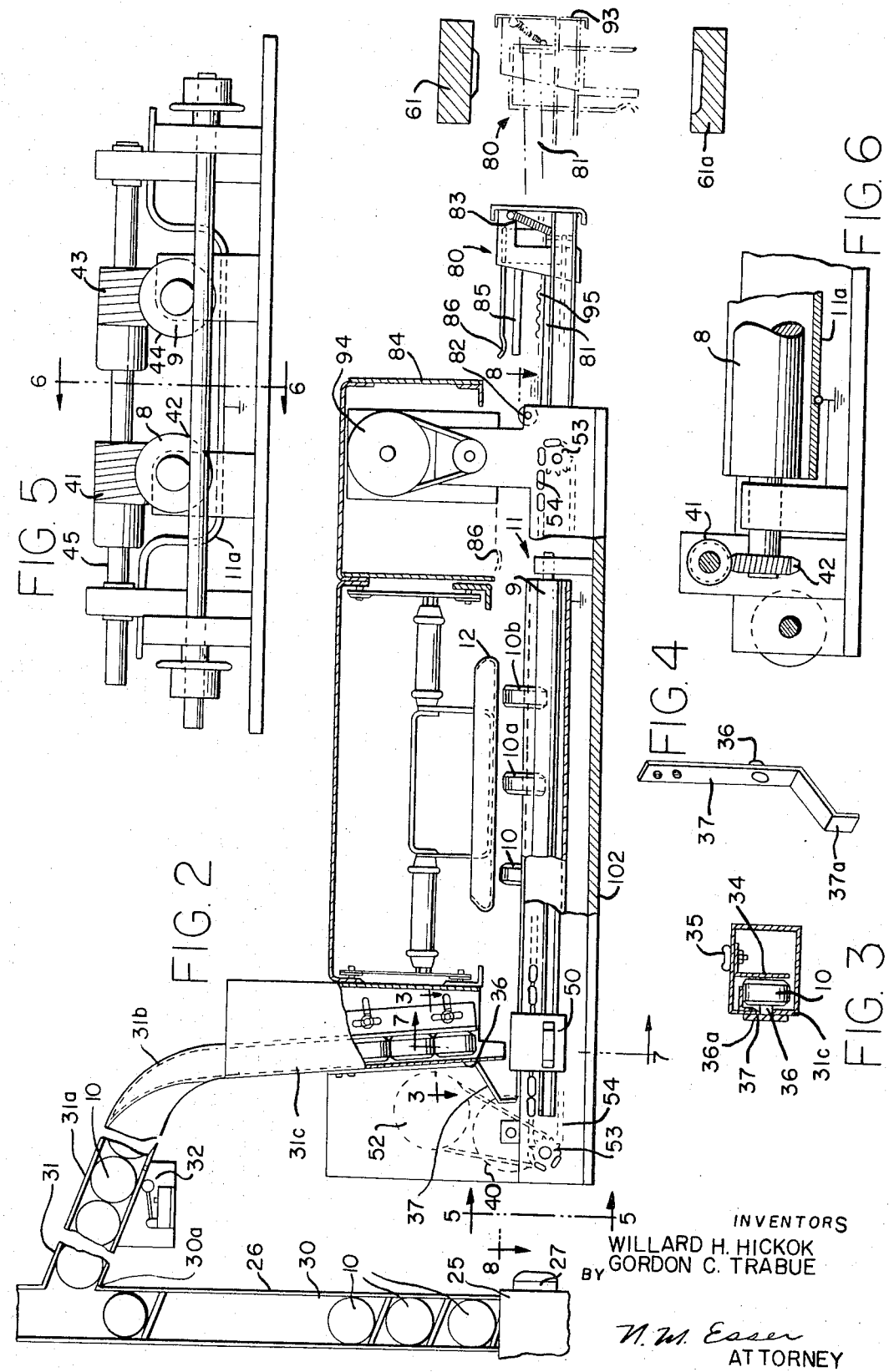

3,359,399
HIGH FREQUENCY HEATING SYSTEM
Willard H. Hickok and Gordon C. Trabue, Louisville, Ky., assignors to Chemetron Corporation, Chicago, Ill., a corporation of Delaware
Filed July 25, 1963, Ser. No. 297,648
5 Claims. (Cl. 219—10.69)

This invention relates to high frequency heating, and more particularly to a system for high frequency dielectric heating.

The present invention provides an improved system and apparatus for carrying out the method for heating round dielectric objects in a high frequency field broadly disclosed in the copending patent application of Boyd R. Hopkins, Ser. No. 276,576, assigned to the same assignee as the present invention.

The invention is shown and described here in an improved system and apparatus for heating round dielectric objects consisting of cylindrical plastic preforms which are heated by the apparatus of the present invention before they are delivered to a press for carrying out molding operations. The plastic cylinders are formed from thermosetting resin material. Therefore, once they have been heated to a desired temperature, they must be immediately transferred to the press for the molding operation. Moreover, the heating of the preforms must be precisely controlled or the preforms will either be undercured or overcured such that they cannot be properly molded. Therefore, should any interruption of the heating cycle take place, for example, through power loss, or arcing, or should the press curing cycle be interrupted after preheating has begun, the preforms being heated cannot be used. It is therefore an important object of the invention to provide means for automatically rejecting the heated round dielectric objects if there is any reason why it would be undesirable to use them after they have been heated.

Another object of the invention is to provide means for ensuring a continuous supply of round objects to be heated to the high-frequency heating apparatus to achieve maximum speed and uniformity of pre-heat.

A further object is to provide means for heating any selected number of round dielectric objects desired during a single heating cycle.

Another object is to provide improved means for uniformly spacing a selected number of cylindrical dielectric objects between the heating electrodes so that there is substantially no distortion of the field during the heating operation resulting in uniform heating of even the top central areas of the dielectric cylinders.

A further object is to provide means for automatically removing the heated preforms from between the electrodes after the heating cycle has been completed.

Still another object is to provide means for automatically transferring the heated dielectric objects to a desired location spaced away from the heating apparatus.

A further object of the invention is to provide means for placing cylindrical dielectric objects in heating position on a pair of rollers for rotating the cylinders during the heatng cycle with the axes of the cylinders oriented parallel to the axes of the rollers.

Still another object is to provide means for automatically loading cylindrical dielectric objects between the electrodes for heating, and for concurrently transferring already heated objects to a desired location displaced horizontally and vertically from the heating apparatus.

Briefly stated, and exemplified in the illustrated embodiment of the present invention, there is provided a pair of parallel rollers for rotating a plurality of cylindrical dielectric objects in a high frequency field during the heating cycle to ensure that they are uniformly heated throughout. The heating apparatus is provided with means for continuously supplying it with preforms including means for sensing the supply of preforms on a conveyor for supplying the apparatus, and switch means for initiating delivery of additional preforms to the conveyor when a low supply condition is sensed.

The apparatus includes a control circuit which may be set to heat any desired number of cylindrical preforms during a heating cycle. The selected number of preforms are delivered by a chute singly to the rollers with their axes parallel to the rollers, and are placed by a loader bar along the rollers, one at a time, with a desired spacing between adjacent preforms sufficient to ensure minimum distortion of the field during heating. During the heating cycle the rollers are driven causing the preforms to be continuously rotated thus providing uniform heating.

At the end of the heating cycle, the loader bar sweeps the heated preforms into a transfer device called a cage for delivering the heated preforms to the molding press. The loader bar then proceeds to reload the rollers with fresh preforms while at the same time the cage delivers the heated preforms to the transfer pot of the press.

The control circuit includes a reject relay which senses any interruption in the heating cycle making it undesirable to use the preforms being heated, and which causes the transfer cage to advance prematurely so that it is not in position to receive the heated preforms when they are delivered by the loading bar. As a result, the undesirable preforms are swept by the loading bar into a discard receptacle. Thus there is no danger of any improperly heated preforms being delivered to the press.

The invention, both as to its organization and method of operation, together with further objects and advantages, will best be understood by reference to the following description taken in connection with the accompanying drawings in which:

FIG. 1 diagrammatically shows a high frequency dielectric heating system including means for rotating round objects being heated and the electrical control circuit for the system in accordance with the invention;

FIG. 2 is an elevation view of a portion of the system of the present invention, partially broken away for clarity, showing the supply of preforms to the heating electrodes, and details of the loader bar, and the cage for transferring the heated preforms to a press;

FIG. 3 is a sectional plan view of the lower portion of the preform supply chute of FIG. 2, taken along the line 3—3, showing interior details;

FIG. 4 is a perspective view of the escapement arm forming part of the preform supply system of FIG. 2 showing details of its construction;

FIG. 5 is a fragmentary elevation view taken along the line 5—5 of FIG. 2 showing details of the drive for the rolls;

FIG. 6 is a fragmentary elevation view taken along the line 6—6 of FIG. 5 showing further details of the drive for the rolls;

FIG. 7 is a fragmentary elevation view taken along the line 7—7 of FIG. 2 showing details of the loader bar;

FIG. 8 is a plan view of the apparatus of FIG. 2 taken along the line 8—8 showing details of the rolls, loader bar, and discard receptacle;

FIG. 9 is a sectional elevation view taken along the line 9—9 of FIG. 8; and

FIG. 10 is a view showing details of the device for transferring the heated preforms to a point of use.

Referring now to the drawings, and particularly to FIG. 1, the invention in one form has been shown as it is employed in a high frequency dielectric heating system for elevating the temperature of a dielectric load such as one or more plastic preforms 10, carried by a pair of cylindrical brass rolls 8 and 9 (see FIG. 8), which may advantageously be covered with a sleeving approximately 0.015″ thick of an insulating material such as Teflon (E. I. du Pont & Company trade name for polytetrafluoroethylene). The rolls 8 and 9 are electrically connected to an earthed ground via their bearings and drive gears described below, and function as the grounded heating electrode, generally indicated at 11, in the system of FIG. 1.

However, it will be recognized that the system would function similarly if rolls 8 and 9 were insulated from ground in which event dust pan 11a (FIG. 5), of metal and connected to earth ground and extending completely under rolls 8 and 9 would function as the grounded heating electrode.

Above the plastic preform dielectric load 10 is a second heating electrode 12.

The source of high frequency power, which may be taken as representative of typical power generators, includes a power tube 13 of the thermionic type having the customary electrodes therein, which has an anode circuit including a source of anode current whose positive and negative terminals have been indentified as B+ and B−. A radio frequency choke coil 14 is included in the direct-current anode circuit and the high frequency output of the tube 13 is fed by way of a capacitor 15 to a tank coil 20 having one end thereof connected to the electrode 12 and the other end connected to ground.

The grid circuit includes a variable inductance coil 16 having one end connected to a junction point 21, which is connected to a grid leak resistance 22 in series with a grid overload relay coil 23 connected to ground. A bypass condenser 17 is connected between junction point 21 and ground, in parallel relation with grid leak resistance 22 and coil 23. A plate overload relay coil 24 is connected between the grounded side of coil 23 and B−. The grid overload relay coil 23, and the plate overload relay coil 24 operate grid overload relay contacts 23a and plate overload relay contacts 24a, respectively (see upper central portion of FIG. 1).

The cathode of tube 13 is connected to ground.

Although not shown for simplicity, it will be understood that the circuit may also include suitable other switching devices and metering equipment.

Referring now to FIGS. 1 and 2, the system includes means for providing a continuous supply of the cylindrical preforms to the heating electrodes 11 and 12 including a preform hopper 25, which may be at floor level, and an inclined cleated endless conveyor belt 26, driven by a preform supply motor 27. The hopper 25 may have a capacity of several hundred preforms, each about 2″ in diameter by about ¾″ thick, for example. The cleats on the belt 26 are mounted on a slight angle so that the preforms tend to roll to one side of the belt but are restrained from rolling off the cleat by a guard rail 30. When the respective preforms 10 have been elevated to the proper height, an opening 30a in the guard rail 30 permits the preforms to roll into a flexible chute 31, only a fragmentary portion of which is shown. As the chute 31 is flexible, it may be formed around curves. The chute 31 is sloped downward toward the heating electrodes and therefore the preforms will roll by gravity toward the lower end of the chute. The means for providing a continuous supply of preforms includes means for sensing the supply of preforms in the chute comprising a spring-biased, pivotally mounted portion of chute 31 indicated at 31a, which cooperates with a preform demand switch 32 which is maintained closed against a contact 32a (FIG. 1) when there are preforms in chute portion 31a, but which moves to engage contact 32b when chute portion 31a is empty. Engagement of the blade of switch 32 with contact 32b completes a circuit including lines L1 and L2 (FIG. 1), connected to a suitable AC source (not shown) providing means for energizing a starter 27a (FIG. 1) for preform supply motor 27, causing motor 27 to start and thus drive conveyor 26, which, in turn, delivers more preforms to chute 31. Energization of starter 27a also causes contacts 27b to close. Engagement of the blade of switch 32 with contact 32b also completes a circuit to a preform supply timer motor 33 (FIG. 1) controlling a switch 33a. Switch 33a is in series with contacts 27b and starter 27a across lines L1 and L2. Thus starter 27a and motor 27 remain energized as long as timer motor 33 maintains switch 33a closed, and preforms will be continuously supplied to chute 31 via conveyor belt 26 driven by motor 27. Timer motor 33 is adapted to maintain switch 33a closed long enough for motor 27 to substantially fill all portions of chute 31 with preforms. As chute 31 is considerably longer than the fragmentary portion shown in FIG. 2 next to guard rail 30, a substantial supply of preforms can be stored in chute 31, ensuring a continuous supply of preforms for the preform heating operation.

Chute 31 has a flexible curved portion 31b which may be curved as indicated in FIG. 2, so that the preforms in the lowermost, substantially vertically extending portion of the chute 31, indicated at 31c, are oriented with their axes substantially parallel to the axes of the rolls 8 and 9. Chute portion 31c includes means for adjusting the clearance for the preforms to accommodate various sizes of preforms comprising a movable inner wall 34 (FIG. 3) which is secured to chute 31c by wing nuts 35 extending through slots 36 in chute 31c. Wall 34 is adjusted to provide just enough clearance for the preforms to pass through chute portion 31c, in single file, one above the other, so that the preforms emerge one at a time from the open lower end of chute portion 31c.

The preforms 10 are retained in chute 31c until required, and then dropped on rolls 8 and 9 one at a time, by an escapement arm 37 (FIGS. 2, 3 and 4) of spring steel or the like, provided with a pad of resilient friction material 36 such as rubber, which extends into chute 31 through a suitable opening and bears against the lowermost preform in chute 31c. Arm 37 is an approximately reverse L-shaped member with a downturned extension 37a on its lower free end which is disposed in the path of a loader bar 50 for loading the preforms in heating position. The upper portion of arm 37 is suitably fastened to chute portion 31c. Arm 37 is stiff enough so that there is sufficient friction between the pad 36 and the lowermost preform 10 to hold it and the column of preforms in chute portion 31c above it until the lowest preform is required. At this time, loader bar 50 moves from its "at rest" position as shown in FIG. 2, to the left, engaging escapement arm extension 37a in its path and springing the free end of arm 37 to the left, releasing the lowest preform. The lowest preform 10 is then free to drop on its edge on the rolls 8 and 9 in front of loader bar 50 with its axis horizontal and parallel to the rolls. The loader bar 50 then moves to the right, pushing the preform ahead of it along the rolls. This movement of bar 50 releases escapement arm 37 which then returns to enter chute 31c and presses pad 36 against the lowest preform in chute 31c holding it and the preforms above it.

The rolls 8 and 9 are approximately 1″ in diameter and 3′ long in the illustrated embodiment (see FIG. 8). The centering of the rolls is adjustable to accommodate preforms of various sizes and also so the rolls may be adjusted directly beneath the chute 31c to properly receive the preforms dropped from it. The rolls are driven during the heating cycle at approximately 30 r.p.m. by a motor 40 (FIGS. 1 and 2) suitably connected to drive a shaft 45 carrying a worm 41 in engagement with a worm wheel 42 mounted on the end of roll 8, and a worm 43 which is in engagement with a worm wheel 44 on the end of roll 9.

The circuit shown in FIG. 1 includes a selector switch 51 which may be set for heating the number of preforms desired during the heating cycle. In FIG. 1 the selector switch 51 is provided with contacts a, b, and c, providing a choice of heating 1, 2, or 3 preforms, respectively. However, more preforms can be heated during a heating cycle by adding more contacts and related circuits as outlined below. For illustrating the operation of the system and the loader bar 50 forming part of it, it will be assumed that it is desired to heat three preforms during each heating cycle. The selector switch 51 is then manually operated to engage its contact c (FIG. 1).

The loader bar 50 is driven by a drive motor 52 (FIGS. 1 and 2) which is of the reversible type and which is coupled by conventional means to drive sprockets 53 in engagement with a pair of chains 54, one being secured to each side of loader bar 50 as indicated in FIG. 8. Loader bar 50 is secured to bearings 57 (FIG. 7) which carry it on tracks 60 extending along both sides of the rolls 8 and 9. The loader bar 50 includes a switch actuator block 55 extending from one side of it (FIG. 7) for actuating a series of switches of the limit switch type mounted on a bar disposed along its path.

After a preform is dropped on its edge on the rolls in front of loader bar 50 in the position shown in FIG. 7, the loader bar is actuated as described below to slide the preform on edge along the rolls until it reaches a desired position between the heating electrodes. Let us assume that the preform was moved to the right. The loading bar then returns to the left to the end of its travel. This actuates escapement arm 37 to drop another preform as described above. The loading bar then moves to the right and places the second preform under the electrode 12 but in a position spaced axially from the first preform so there is some space between them. The loading bar then returns to the left and picks up another preform and then moves to the right to deposit the third preform in such a fashion that it is spaced axially from the second preform. After placing of the last desired preform, the loader bar returns to its neutral or "rest" point and the heating apparatus is in the ready state, that is, loaded and waiting for the command to start preheating.

Of course, the timing of the preheating operation must be carefully integrated with the overall cycle of the press. Since the overall cycle of the press is somewhat longer in time than the time required for preheating a load, two timers are employed, a delay timer 97 (FIG. 1) controlling contacts 97a, 97b and 97c, and a heat cycle timer 96 (FIG. 1) controlling contacts 96a, 96b and 96c.

The delay timer receives its starting signal at a certain instant in the cycle of the press. The delay timer 97 at the expiration of its set time, turns on the high frequency heat. Simultaneously, the two rolls on which the preforms rest, are rotated to keep the preforms in continuous motion while they are being exposed to the high frequency field. At the expiration of heat on time, the timer 96 turns off the high frequency heat and stops the rolls. The loader bar 50 now advances towards the preforms sliding preform 10, until it contacts preform 10a, and 10a contacts 10b, and then continues the motion to the right to deposit the preforms into a transport cage. The loading bar then returns to the far left and immediately starts repeating the loading cycle with fresh preforms. Meanwhile the cage transport system extends into the open press and simultaneously with the extension of the cage arm it rotates from the horizontal position, which it occupied during loading, to a vertical position. When the cage is fully extended into the press, it stops at a location directly above the transport pot in the press. The cage then drops the preforms into this pot and returns to the original position it occupied before receiving the preforms. The press now closes and starts the next molding cycle.

The transport cage 80 and assembly (FIGS. 2 and 10) is adapted for transferring the heated preforms to a desired location horizontally and vertically displaced from the electrodes, namely, the transfer pot 61a in the press for receiving the preforms indicated generally at 61 in FIG. 2. However, it should be mentioned at this point that the heating apparatus shown in FIG. 2 fits upon a platform (not shown) permitting an adjustable height. This is used to place the cage 80 at the right position for discharge into the press. As the chute 31 is flexible it readily permits this adjustment.

The first position of cage 80 is slightly extended from the heating electrodes, and the partial view on the right shows the relative position of the cage when it is fully extended. A pivot cam or turning bar 81 (FIG. 2) cooperates with a roller cam follower 82 and a spring 83 for pivoting the cage 80 from the horizontal to the vertical as the cage extends to the right as shown in FIG. 2. The pivot cam 81 is shaped so that the first few inches of motion of the cage after leaving the high frequency heating cabinet, indicated at 84 in FIG. 2, does not cause any rotation of cage 80.

Cage 80 is provided with three fingers or tines 85 which are adjustably secured to a slotted mounting plate portion of the cage 80 to accommodate a variety of sizes. A fourth retainer finger 86 is provided to ride over the preforms and close slightly behind them once they are in cage 80. Retainer 86 is spring loaded so that the preforms are held in the cage as the cage is rotated to the vertical position. A mobile trip block 87 (FIG. 10) is so positioned that its distance is constant with respect to the pivot point of the cage. When the cage is fully extended the trip block 87 encounters a stationary trip block 87a. Coarse adjustment depends upon the position of the mobile trip block 87 which is set for the length of desired cage travel by adjusting a long threaded member 92 on which it is mounted. When the cage is fully extended the retainer finger 86 on the extended cage is caused to move just far enough to drop the heated preforms. A retaining finger trip block 90 has a screw 91 which permits fine adjustment of the trip point.

When the cage is in retracted position as during heating, indicated by the broken line in FIG. 2, the back wall 93 of the cage serves as a door for the high frequency heating cabinet indicated at 84 in FIG. 2.

The cage 80 is driven by a motor 94 (FIGS. 1 and 2), of a reversible type, which drives gears including pinion gears which cooperate with racks 95 on both sides of cage 80 to drive the cage to and from the heating apparatus.

At the expiration of the high frequency heating period controlled by heat cycle timer 96 (FIG. 1), the loader bar 50 moves from its rest position to the right, pushing the preforms ahead of it into cage 80. The loader bar 50 is controlled by a series of relays including relay coils 62–70 shown in FIG. 1, controlling their respective contacts designated 62a, 62b, etc. Loader action is initiated by energizing an energy point 112 (FIG. 1), energizing relay coil 62, which holds through normally closed contacts 63a (FIG. 1), contacts 62a, contacts 70a, 62b, to L1. This completes a circuit through the upper coil of loader bar drive motor 52 causing the loader bar to move to the right loading cage 80 with heated preforms.

When bar 50 and its actuator 55 reach a limit switch 216 (FIGS. 1 and 8), bar 50 is reversed by closing of the switch and goes back to the left to pick up its first preform. Loader action is energized from energy point 117, coil 64 is then energized and holds through contacts 64a, coil 63, contacts 62c, contacts 63c, 117, 70a, 63b to L1. This completes a circuit through the lower coil of loader drive motor 52 causing bar 50 to move to the left to pick up the first preform.

As the loader bar moves to the left it hits arm 37 causing a preform to fall on the rolls behind bar 50 as indicated in FIG. 7 and then hits switch 211 (FIGS. 1 and 8), causing bar 50 to reverse to place the first preform. This is traced from energy point 117, switch 211, contacts 64b, coil 65, contacts 65a, energy point 112, coil 62, contacts 63a, contacts 62a, completing a circuit through the upper coil of motor 52 causing bar 50 to move in one direction of the arrow above the upper coil of motor 52 in FIG. 1 until it encounters an active switch. In the meantime the circuit has energized limit switch 215 which is mounted along the path of actuator 55 at a position selected to place the first preform at a desired location. The loader bar and preform advance to this position. Activation of switch 215 then reverses the motion of the loader bar to the left. This is traced through voltage point 117 (FIG. 1), contacts 65c, switch 215, coil 66, contacts 66b, coil 63, contacts 62c, contacts 63c to voltage point 117. The loader bar will proceed to switch 211 as before and receive another preform from chute 31 before starting right again.

At this time a switch 214, mounted along the path of actuator 55 at a position spaced from switch 215 so as to provide a desired axial spacing between the first and second preforms to ensure minimum distortion of the high frequency field during the heating cycle, is activated. The position of selector switch 51, of course, determines which switch will be activated at a given time. As switch 214 is energized the second preform 10a will stop at the desired location. This is traced from voltage point 117, switch 211, contacts 66c, coil 67, contacts 67a, voltage point 112, contacts 63a, upper coil of motor 52, contacts 67c to switch 214.

The loader again returns to the left due to the motor reversal. Again a preform drops and switch 211 reverses the motion of the loader bar. Switch 213 (FIGS. 1 and 8), mounted along the path of actuator 55 at a location adapted to provide the desired axial spacing between second preform 10a and third preform 10 is now activated and the loading proceeds to this position. When switch 213 is operated by the loading bar the preform 10 is dropped and the loader again starts to the left. Switch 212 is now energized and when the loader bar reaches it the drive motor is de-energized and the loader bar comes to rest. Meanwhile the cage 80 which had started moving earlier, reaches full extension into the press and discharges the hot preforms. In this position the cage 80 actuates a limit switch 218 (FIG. 1) which reverses its motion. This activates a limit switch 217 (FIG. 1) which is actuated when cage 80 is completely retracted to shut off its motor 94 (FIGS. 1 and 2).

The system includes means for sensing any interruption of the heating cycle comprising a reject relay coil 101 (FIG. 1) controlling contacts 101a, 101b, 101c and 101d. Reject relay coil 101 is energized under normal operations but is de-energized if any interruption of the heating cycle is sensed, i.e., if power is lost for any reason; or should the equipment operation be interrupted during a pre-heat (as by an arc, etc.); overload of the plate or grid, or should the press curing cycle be interrupted after preheating has begun, and at the option of the operator by manual control by operating manual reject switch 230 (FIG. 1). De-energization of relay coil 101 causes the cage 80 to advance prior to the arrival of the preforms. The preforms, therefore, rather than being placed in the cage, are swept over the ends of the rolls 8 and 9 by loader bar 50 and fall into a discard chute 102 (FIG. 8). The circuit of FIG. 1 also includes a preform supply and heater ready light 103, and a manual stop switch 104 (FIG. 1).

It will be recognized that the system described above provides substantially automatic means for preheating cylindrical dielectric objects in groups of a desired number and includes fail-safe protective devices such that the system may be operated unattended for substantial periods of time. Costly damage to molds by improperly heated preforms cannot occur in view of the disclosed preform rejection arrangement.

This rejection occurs when coil 101 (FIG. 1) is de-energized for any of the reasons previously stated. The motion of the loader bar actuator 55, traveling towards the cage, makes switch 215 (FIG. 1) close. Thus voltage from point 123 through 215, 101a, 218b, 218a, energizes coil 76. Energizing coil 76 allows voltage from L1 through 76c to start the motor 94, thus moving the cage before the loading bar has had time to reach it, resulting in the discard of the improperly heated preforms into opening 102 (FIG. 8). So that the next cycle will not be rejected coil 101 is reenergized as the cage activates switch 218b (FIG. 1) to deenergize coil 76. This action allows voltage to reach the cage return winding of the motor through 76d, 217, and 230a. The cage is arrested at the home or "at rest" position when it interrupts switch 217 by its own motion.

Normal delivery occurs when coil 101 (FIG. 1) is energized and (1) blocks the action of switch 215a which starts the cage before the loading bar and preforms reach it and (2) initiates cage motion by means of switch 216a at which time the preforms are in the cage.

Another feature of the disclosed system is the angular disposition of the loading chute portion 31c which ensures that the preform dropped on the rolls when loading bar 50 hits arm 37 does not topple over. This is due to the angle thus provided between the edges of the lowest preform retained in the chute and the preform resting on the rolls 8 and 9 resulting in at most a slight point contact between these two preforms as the loading bar advances.

While there has been described what is at present considered to be the preferred embodiments of the invention, it will be understood that various other modifications may be suggested to those skilled in the art and all such modifications are intended to be included within the scope of this invention as best defined in the appended claims wherein there is claimed:

1. Apparatus for high frequency heating of dielectric cylinders comprising, means for generating a high frequency field including at least two spaced heating electrodes, means for depositing in heating position between the electrodes a plurality of dielectric cylinders in spaced relation to each other, means for rotating the cylinders with respect to the electrodes during a heating cycle to ensure uniform heating throughout, means for terminating the heating cycle at the end of a desired heating time interval, means for removing heated dielectric cylinders from heating position after the heating cycle, first transfer means for transferring the heated dielectric cylinders to a desired location spaced away from the electrodes, second transfer means for receiving rejected dielectric cylinders, sensing means for automatically sensing any interruption of the heating cycle, and means responsive to the last mentioned means for removing heated objects to said second transfer means in response to actuation of said sensing means.

2. Apparatus for high frequency heating of dielectric cylinders comprising, means for generating a high frequency field including at least two spaced heating electrodes, roller means between said electrodes for receiving a plurality of dielectric cylinders in heating position between said electrodes, means including a loader bar for depositing said plurality of dielectric cylinders in spaced relation to each other along said roller means to insure minimum distortion of said cylinders during a heating cycle, means for rotating said roller means during a heating cycle to insure uniform heating throughout, means for terminating the heating cycle at the end of a desired heating time interval, transfer means movable into cylinder receiving position at one end of said roller means, discard means at said one end of said roller means for receiving rejected cylinders, means for moving said roller bar across said roller means to push said plurality of cylinders off said one end of said roller means at the conclusion of a heating cycle, sensing means for automatically sensing any interruption of a heating cycle, and means responsive to said sensing means for automatically directing said plurality of heating cylinders selectively into said transfer or said discard means.

3. Apparatus for high frequency heating of dielectric cylindrical material comprising, means for generating a high frequency field including at least two spaced heating electrodes, support means between said electrodes for receiving dielectric cylindrical material in heating position between said electrodes, means for terminating the heating cycle at the end of a desired heating time interval, transfer means movable into material receiving position at one end of said roller means, discard means at said one end of said roller means for receiving rejected material, means for pushing said material off said one end of said support means at the conclusion of a heating cycle, sensing means for automatically sensing any interruption of a heating cycle, and means responsive to said sensing means for automatically directing said heated material selectively into said transfer or said discard means.

4. Apparatus for high frequency heating of dielectric cylinders comprising, means for generating a high frequency field including at least two spaced electrodes, roller means between said electrodes for receiving a plurality of axially spaced cylinders, a supply chute for supplying said dielectric cylinders to said rollers one at a time, a loader bar movable across said rollers for pushing a dielectric cylinder to predetermined position along said roller means, means for controlling said roller bar for successive movements whereby said dielectric cylinders are successively aligned axially on said rollers in spaced relation to each other to insure minimum distortion of said cylinders during a heating cycle, means for rotating the cylinders with respect to the electrodes during the heating cycle to insure uniform heating throughout, means for terminating the heating cycle at the end of a desired heating time interval, and means for actuating said loading bar to push said plurality of dielectric cylinders from the rollers at the completion of a heating cycle.

5. Apparatus for high frequency heating of round dielectric objects comprising, a pair of rolls defining first heating electrode means, second heating electrode means, means including said pair of rolls for rotating a round dielectric object during a heating cycle in a high frequency field established between the first electrode means and the second electrode means so the object is uniformly heated throughout, and means for rejecting the heated object at the end of the heating cycle if desirable.

References Cited
UNITED STATES PATENTS

| | | | |
|---|---|---|---|
| 1,572,873 | 2/1926 | Allcutt | 13—27 |
| 2,325,638 | 8/1943 | Strickland | 219—10.69 |
| 2,679,573 | 5/1954 | Newhouse | 219—10.69 |
| 2,779,848 | 1/1957 | Bosomworth et al. | 219—10.69 |
| 2,866,063 | 12/1958 | Rudd | 219—10.73 |
| 2,872,740 | 2/1959 | Schaevitz | 34—68 |
| 2,911,510 | 11/1959 | McNutty | 219—10.73 |

RICHARD M. WOOD, *Primary Examiner.*

L. H. BENDER, *Assistant Examiner.*